United States Patent Office

2,774,665
Patented Dec. 18, 1956

2,774,665

PRODUCTION OF SOLUBLE SULFIDES

Eugene W. Schoeffel and Daniel M. Barton, Kronenwetter, Wis., assignors to Sterling Drug Inc., New York, N. Y., a corporation of Delaware No Drawing. Application November 12, 1953, Serial No. 391,753

8 Claims. (Cl. 92—2)

This invention relates to a method for the preparation of a water-soluble sulfide and is more particularly concerned with the conversion of a soluble sulfate to a soluble sulfide in an alkaline solution.

Alkaline aqueous solutions of soluble sulfides, particularly those of sodium and the other alkali metals, are used widely in industry for a number of purposes. One of the largest uses of such alkaline sulfide solutions, especially of alkaline sodium sulfide solutions, is in the preparation of wood pulp by the Kraft and other alkaline sulfate processes. In these processes wood chips are cooked with a solution containing sodium hydroxide, sodium carbonate and sodium sulfide, the proportions and concentrations of each depending upon the particular grade of pulp desired. Alkaline sodium sulfide solutions are also used in the tanning and other industries.

The recovery of products of economic value from spent liquors obtained from processes employing alkaline sulfide solutions generally presents a serious problem. Such spent liquors are highly contaminated with organic matter and usually contain, in addition to alkalies and sulfides, other substituents including carbonates, thiosulfates, sulfates and miscellaneous sulfur acid salts. They are generally foul smelling, have a high biological oxygen demand and even their disposition without recovery of products of economic value therefrom presents a serious problem. Many processes have been suggested for disposing of or for utilizing such liquors, but each heretofore suggested process has presented difficulties in the way of inconvenience, of cost of operation, loss of material, or recovery only of products of low or doubtful economic value. As a result, the treatment of these liquors in one way or another, as opposed to simply discarding them, has been forced upon industry largely as a matter of overcoming a nuisance rather than as a matter of recovering products justifying the process from an economic point of view.

In the case of the alkaline sulfate pulping process, such as the so-called "black liquor" from the Kraft process, a method frequently employed in dealing with the waste liquors, consists of first evaporating the black liquor to a solids content of about fifty percent, so that the residue will support combustion, and feeding the concentrate to a recovery furnace wherein the organic materials are burned. The remainder of the waste is evaporated during the burning and there is obtained an ash or residue containing sodium carbonate, sodium sulfide and sodium sulfate, together with minor proportions of thiosulfates and salts of other sulfur acids.

This part of the process, though widely practiced, is very uneconomical for a number of reasons. In order to reduce evaporation costs, it is uneconomical to wash the pulp as thoroughly as is desirable and as a consequence the bleachability of the pulp is often seriously impaired. During the concentration of the black liquor and washings enormous quantities of water must be evaporated with the attendant cost. The loss of salts during the pulp washing, evaporation and combustion steps of the process is also large and often amounts to as much as twenty percent of the salts used in the original pulping operation. This loss is occasioned by the retention of salts in the pulp, by incomplete washings, by spray losses from the evaporator, and by actual volatilization and dusting from the recovery furnaces.

The ash from the recovery furnace is often utilized by first dissolving it in water and filtering off the remaining char and other water-insoluble substances to form what is known in the trade as "green liquor." The green liquor can be limed to convert the sodium carbonate therein to sodium hydroxide with the accompanying precipitation of calcium carbonate which is removed by filtration. A further loss of two or three percent of soluble salts generally occurs in this step of the process due to the difficulty of filtering the calcium carbonate when it is precipitated under the conditions prevailing in the green liquor. The filtrate from the liming operation is generally referred to in the trade as "white liquor" and contains sodium hydroxide, sodium carbonate, sodium sulfide and a substantial amount of sodium sulfate.

The white liquor is generally combined with a portion of unevaporated black liquor and, after the concentrations of salts have been adjusted to the desired values by addition, the mixture is returned to the digester.

It is obvious that this is a costly procedure to carry out, that the losses are excessive and that the economy of the entire operation depends to a great extent upon how much of the original black liquor can be recirculated without building up undesired products to a detrimental degree in the digester system. Additionally, a rather extensive control system must be utilized to assure that the proper ratio of sodium hydroxide to sodium sulfide is maintained. The general overall economy of the process is such that very little profit is realized therefrom, the principal value being in the overcoming of the nuisance of disposing of the black liquor. This nuisance is not entirely overcome even using the process described because there is a considerable evolution of sulfur, in the form of hydrogen sulfide both from the evaporator and from the recovery furnace and this is ordinarily allowed to pass into the air. In addition, if the steam from the evaporator is condensed, the condensate is alkaline in nature and laden with sulfides and its disposal presents a serious problem.

It is thus seen that the present methods of disposing of or of recovering economic values from waste alkaline sulfide liquors leaves much to be desired. Such a method, to be most satisfactory, should recover a very high percentage of the total salts in the waste liquor in a form wherein they are either utilizable in the original process without further treating or from which valuable products can be obtained easily and in a state of sufficient purity. Furthermore, the process should avoid the costly utilization of heat for evaporating large quantities of water and should not involve the discharge into the atmosphere of objectionable sulfur compounds or the disposal of alkaline or otherwise contaminated liquids.

United States Patent 2,072,177 has described a procedure for the disposal of waste sulfide liquor with the recovery of certain salts therefrom. This patent procedure involves the evaporation of about fifty percent of the liquid, subsequent burning of the concentrated organic matter, adding sufficient sodium sulfate to make up that lost in the burning and concentration steps (with the concomitantly required laboratory and personnel), dissolving the remaining salts in water, causticizing to a point where all of the sodium carbonate has been converted to sodium hydroxide, and then proceeding with a barium sulfide cycle. This procedure has many inherent difficulties including the unrecoverable loss of considerable sulfur and sodium through heating and inadequate washing losses (approximately 225 pounds as sodium sulfate, per ton of pulp), the contamination of sulfide cooking liquor because of limited washing, and requires about forty percent conversion of the total sodium oxide in the barium cycle, an extremely expensive procedure. Further, there is a considerable air pollution problem created by the dissipation of sulfur to the air.

It has now been found that by following the procedure herein described and claimed, it is possible to utilize as many washings as necessary to achieve a relatively pure product, to achieve a cyclic procedure requiring substantially no make-up of the sodium and sulfur, anr requires only a 25 percent conversion of sulfate to sulfide in the barium cycle.

The process of the present invention contemplates that black liquor obtained directly from the digester and pulp washings will be subjected to a liquid phase oxidation and the inorganic salts which result therefrom will be treated with calcium hydroxide, the mixture filtered, the filtrate treated with barium sulfide, and the resulting filtrate used in a pulping procedure. It is to be understood that the above sentence constitutes a simplified generic description of the invention which is more fully described and explained hereinafter.

The foregoing and additional advantages may be accomplished utilizing as the first step, the process described in copending United States application Serial 152,264, filed March 26, 1950, by F. J. Zimmermann, now United States Patent 2,665,249. This process oxidizes black liquor with elemental oxygen to destroy all of the organic constituents therein and to produce an oxidized liquor consisting substantially of water, sodium carbonate and sodium sulfate. As described in the application referred to, the organic constituents of the alkaline black liquor are readily oxidized substantially completely to carbon dioxide and water by subjecting them to the action of oxygen, in the form of air or a more concentrated oxygen, at a temperature of 240 degrees centigrade, or higher, and under a pressure sufficient to maintain a large portion of the water in the liquid phase.

The oxidation reaction is exothermic in character and proceeds rapidly without external heating once the reaction temperature has been attained. Excess heat over that required to heat the materials entering the reaction vessel to the reaction temperature is removed as steam which, due to its high temperature and pressure, is available for doing active work. The steam also contains carbon dioxide, resulting from the oxidation of the organic substances in the black liquor, together with any non-reactive gases, e. g., nitrogen, which are introduced into the oxidation vessel along with the oxygen.

The oxidation of the black liquor is generally carried out in continuous fashion, the liquor and air being passed through a tower. The hot steam and other gases are withdrawn from the top of the tower and the oxidized solution containing sodium carbonate and sodium sulfate as substantially the only dissolved substances, is withdrawn from the bottom of the tower. The latter is usually passed through a flash evaporator to recover additional steam for power or process purposes and to cool the liquid to below about 100 degrees centigrade. The cooled oxidized solution can then be filtered, if desired, to remove any small amounts of insoluble matter which may have accumulated in it. The filtrate thus obtained is a clear, clean, substantially non-odorous solution in which all of the sulfur has been oxidized to sulfate and in which all of the alkali present in the black liquor has been converted to carbonate.

Due to the fact that a considerable proportion of the water is evaporated from the black liquor during the oxidation process to dissipate the heat of oxidation, as will be apparent later, it is advisable to maintain the volume of the solution substantially constant to provide a final alkaline sulfide-containing solution of suitable concentration for recycling to the digster. This allows the pulp from the digester to be washed with larger quantities of water than is used in the conventional processes, the washings being added to the black liquor before oxidation. This yields a better and more easily bleached pulp and recovers a large proportion of the salts normally left in the pulp in the hitherto described processes. The quantity of the additional water used in washing the pulp is conveniently adjusted to equal approximately that evaporated during the oxidation step so that the solution drawn off from the oxidation vessel is adjusted to substantially the same volume as the actual black liquor oxidized.

The loss of salts and of sulfur-containing gases in the steam from the oxidation vessel is extremely low and can be reduced substantially to zero by proper procedural practice. Any such small loss as may occur is more than offset by the recovery due to the additional washing of the pulp. In practice, it has been found that about fifty percent more water can be used in washing the pulp than is ordinarily used in more conventional processes and that substantially all of the additional wash water is recovered from the oxidation vessel or the flash evaporator as usable steam. The liquid salt solution from the oxidation unit contains substantially all of the salt values introduced into the digester with the wood chips.

The liquid salt solution thus obtained is then treated with lime, generally until no further precipitate of calcium carbonate is formed. By this procedure, about ninety percent of the sodium carbonate in the solution can be converted to sodium hydroxide and an equivalent amount of insoluble calcium carbonate formed. Further addition of lime fails to precipitate the rest of the carbonate or any appreciable quantity of the sulfate as calcium sulfate because, as the solution is limed, its alkalinity is increased and equilibrium between the various constituents is reached under strongly alkaline conditions which prevents the precipitation of the remainder of the carbonate as calcium carbonate and of the sulfate as calcium sulfate. It is apparent that the equilibrium point will vary considerably depending upon the actual concentrations of sodium carbonate and sodium sulfate in the liquid limed. Under the conditions normally encountered in the working up of the black liquor as just described, however, it has been found that about ten percent of the sodium carbonate and all of the sodium sulfate remains in the solution. The liming operation is preferably carried out in hot solution because this promotes the formation of a more rapidly filtering calcium carbonate, and eliminates any tendency for calcium bicarbonate to be formed, and also avoids the cooling of the already hot liquid salt solution from the oxidation vessel. The addition of lime in an amount just sufficient to precipitate a maximum amount of the carbonate ion, but less than sufficient to provide an excess of lime constitutes a step in the operation of the present invention.

The limed solution is next filtered and the cake of calcium carbonate is washed thoroughly on the filter and the washings added to the main filtrate. The calcium carbonate thus obtained is substantially pure and can be kilned in a conventional manner to recover substantially enough lime for use in liming a succeeding equivalent proportion of oxidized liquor.

The filtrate from the calcium carbonate which contains sodium hydroxide, sodium sulfate and a small proportion of sodium carbonate is then treated with barium sulfide.

A soluble sulfate contained in an alkaline aqueous solution containing a small amount of carbonate ions can be reacted with barium sulfide to form insoluble calcium sulfate and a soluble sulfide, the particular sulfide depending upon, of course, the particular sulfate originally in the solution. The precipitation of barium sulfate is selective in the presence of a soluble carbonate in the solution. This reaction is not to be expected from a consideration of the result obtained by adding calcium sulfide or strontium sulfide to such a solution. When calcium sulfide, for example, is added to an alkaline solution containing both a soluble carbonate and a soluble sulfate, the carbonate is preferentially precipitated as calcium carbonate and calcium sulfate is not precipitated even though the solution is only moderately alkaline. The same is substantially true with strontium sulfide. When, however, barium sulfide is added to such a solution, barium sulfate is precipitated immediately and, if the amount of barium added is sufficient, the soluble sulfate content of the mixture is reduced to an extremely low value even in the presence of high concentrations of strong alkalines before any appreciable proportion of barium carbonate is formed. This furnishes a ready method of converting soluble sulfates in strongly alkaline solutions to the corresponding sulfides without contaminating the resulting solution with any appreciable amount of added material. The process is capable of being operated under widely varying conditions of temperature and concentrations of soluble sulfate, and also of the soluble carbonate if such is present, and can be operated so as to produce solutions substantially free of both barium and sulfate ions. The barium sulfate which is formed can be separated readily by filtration and washed substantially free of alkali and of carbonate and sulfide ions without difficulty, thus reducing the loss of the latter to a negligible value. A good grade of barium sulfate is recovered which is generally entirely suited for most purposes. A preferred method of utilizing the barium sulfate comprises reducing it to barium sulfide, e. g., by rotating it with carbon in conventional fashion, and returning the barium sulfide to the process. In this way, the process can be operated in cyclic fashion and, due to the completeness of the separation of barium from the alkaline sulfide solutions as barium sulfate, little or no makeup of barium being required other than to compensate for such slight mechanical losses as may occur.

The conditions under which the barium sulfide is added to the alkaline solutions are not particularly critical although a better filtering precipitate is formed, and otherwise favorable conditions prevail, when the barium sulfide is added to and mixed with the alkaline solution at a somewhat elevated temperature. Satisfactory results have been attained at a temperature between about 50 and 100 degrees centigrade. The barium sulfide can be ground and added to the alkaline solution in solid form although a preferred procedure is to dissolve the barium sulfide in water and to then mix the solution. Under any circumstances, the mixture should be agitated thoroughly to insure as nearly complete equilibrium as possible between the various constituents. The amount of barium sulfide added should be substantially chemically equivalent to the amount of soluble sulfate which it is desired to remove from the solution. The amount of barium sulfide added can be regulated to produce a solution which is substantially devoid of soluble sulfate or in which any desirable proportion of the soluble sulfate remains in solution. In the event of an additional equivalent amount of soluble sulfides, the addition of an amount of barium sulfide greater than that chemically equivalent to the soluble sufate in the solution leads to the precipitation of barium carbonate and the formation of an additional equivalent amount of soluble sulfide.

Following the addition of the barium sulfide and the agitation of the mixture, the latter is filtered. The cake of barium sulfate is generally washed thoroughly with water on the filter and the washings added to the filtrate. The barium sulfate can then be dried and mixed with powdered coal or charcoal and the mixture roasted in conventional fashion to produce barium sulfide in an amount substantially equal to that originally added to the alkaline solution.

The filtrate from the barium sulfate contains the alkali in the original alkaline liquor together with any remaining soluble carbonate and sulfate and is enriched with an amount of soluble sulfide substantially chemically equivalent to the barium sulfide added. The solution can, without further treatment, be used for substantially any purpose for which an alkaline solution of the soluble sulfide is desired.

The final liquor thus obtained can by proper adjustment of the lime and the barium sulfide used in the respective steps of the process be produced to contain substantially all of the sodium ion originally in the black liquor in the form of sodium hydroxide, carbonate, sulfide and sulfate and, furthermore, in the proportions of one to another which are most advantageous for use of the final solution directly in the digester with fresh wood chips. This eliminates the necessity, as conventionally practiced, in most hitherto described processes, of saving out a portion of the black liquor to combine with the final alkaline sulfide liquor to give a satisfactory cooking liquor.

As applied to the utilization of black liquor the process also has numerous advantages not mentioned heretofore. Thus, there is no discharge of noxious gases into the atmosphere, the only such discharged product being carbon dioxide from the oxidizing vessel, together with nitrogen in case air is used for the oxidation. Furthermore, there is a considerable increase, up to 4,000 or 6,000 pounds per ton of pulp, of useful steam produced in the process over that available from any of the hitherto devised disposal processes. All of the steam produced in the present process is of high quality. The loss of sodium salts, as pointed out previously, is extremely low throughout the entire process and seldom amounts to more than two or three percent of that originally introduced into the digester. The important advantages of producing a better washed and a more easily bleached pulp have been mentioned previously.

It is apparent from the foregoing description that the invention is based to a considerable extent upon the discovery that barium sulfide in presence of sodium carbonate (10%) will react with a soluble sulfate in a strongly alkaline solution to form a soluble sulfide and insoluble barium sulfate which can be separated readily by filtration. It has also been pointed out that any soluble carbonate which may be in the solution will also react with the barium sulfide, but only after all of the soluble sulfate has reacted. There is formed as result of this latter reaction insoluble barium carbonate, which can be separated by filtration along with the barium sulfate, together with an additional quantity of soluble sulfide. This reaction can proceed until substantially all of the soluble carbonate is converted to soluble sulfide if sufficient barium sulfide is added.

This furnishes a ready means for preparing solutions containing a soluble alkali, a soluble carbonate, a soluble sulfate and a soluble sulfide in substantially any desired proportions and concentrations starting with a suitable solution consisting only of a soluble carbonate and a soluble sulfate in water. Such a solution is first limed to create the desired degree of alkalinity and the calcium carbonate which is formed is removed by filtration. The filtrate is then treated with barium sulfide to produce a desired amount of soluble sulfide in the solution and the barium sulfate removed by filtration. Any unreacted soluble carbonate or soluble sulfate remains dissolved and is found in the filtrate from the barium sulfate.

It is, of course, possible by the addition of sufficient quantities first of lime and then of barium sulfide to produce alkaline solutions of the soluble sulfide which are substantially devoid of soluble sulfate or of both soluble sulfate and soluble carbonate. It is, however, not possible, according to this process to produce alkaline solutions of soluble sulfides which contain a soluble sulfate but are devoid of a soluble carbonate because, under the alkaline reaction conditions, the liming operation will not precipitate all of the carbonate and the barium sulfide will not react with the remaining carbonate until the solution is substantially free of sulfate ion.

Certain advantages of the invention are apparent from the following examples which are given by way of illustration only and are not to be construed as limiting.

*Example 1*

Approximately one gallon of a Kraft waste liquor containing 75.0 grams per liter of organic carbon, 6.1 grams per liter of carbon dioxide, 57 grams per liter of sodium as sodium hydroxide, 6.5 grams per liter of sulfur, having a pH of 12.3, a specific gravity at 25 degrees centigrade of 1.082, and a total solid content of 176.3 grams per liter, was subjected to aqueous phase oxidation at 285–300 degrees centigrade for sixty minutes, under a reaction pressure of approximately 1800 pounds per square inch. There was thus obtained a liquid material containing less than five grams per liter of organic carbon and less than five grams per liter of acetic acid. This material was concentrated to a volume of approximately 1.4 liters and thereafter contained 150 grams per liter of sodium carbonate, 70 grams per liter of sodium sulfate, and 12 grams per liter of sodium acetate. Eighty grams of calcium oxide was added to one liter of the concentrate with vigorous stirring. After the addition had been completed, the mixture was heated to 85–90 degrees centigrade for sixty minutes while the stirring was continued and thereafter filtered. The precipitate was washed with two 100-milliliter portions of water at 85–90 degrees centigrade and the washings added to the filtrate. The combined washings and filtrate contained 97 grams per liter of sodium hydroxide, 11.5 grams per liter of sodium carbonate, 66.0 grams per liter of sodium sulfate, and 11.4 grams per liter of sodium acetate. To this filtrate was added 79 grams of barium sulfide while agitating the filtrate vigorously and the mixture thereafter heated to 95 degrees centigrade for thirty minutes while continuing the stirring. The mixture was filtered, the precipitate washed with approximately two 75-milliliter portions of 85–90 degrees centigrade water. The filtrate contained 97 grams per liter of free sodium hydroxide, 11.5 grams per liter of sodium carbonate, 2.2 grams per liter of sodium sulfate, and 35.8 grams per liter of sodium sulfide and 11.4 grams per liter of sodium acetate. This material is suitable for sulfide cooking material. It will be noted that there has been substantially no loss of either sulfur or sodium in the reconversion procedure.

*Example 2*

189 gallons of waste liquor from the Kraft pulping process containing 47.6 grams per liter of organic carbon, 45 grams per liter of sodium as sodium hydroxide, 5.4 grams per liter of sulfur, 3.5 grams per liter of carbon dioxide, a total solids content of 130 grams per liter and having a specific gravity at 20 degrees centigrade of 1.068, was subjected to aqueous phase oxidation at 285 degrees centigrade under a reaction pressure of approximately 2000 pounds per square inch. There was thus obtained 43.2 gallons of liquid discharged from the reactor containing 5.4 grams per liter of organic carbon, 7.8 grams per liter of acetic acid, 5.8 grams per liter of sulfur and 47.1 grams per liter of sodium as sodium hydroxide, as calculated on the original liquor volume. The oxidized liquor was diluted to 65 gallons and caustified with 30.5 pounds of calcium oxide (lime). The caustified liquor was filtered to remove 52 pounds of dry calcium carbonate containing only traces of sodium. Forty-five pounds of barium sulfide was added to the hot caustified liquor and heated for one hour at 90–95 degrees centigrade with agitation. This mixture was filtered to give a washed precipitate containing 55 pounds of barium sulfate and only traces of sodium when dry. After washing and concentrating there was obtained 43.2 gallons of filtrate which gave the following analyses:

| | g. l. |
|---|---|
| Sodium as sodium hydroxide | 189.4 |
| Free sodium hydroxide | 81.8 |
| Total sulfur | 26.7 |
| Sodium sulfide | 53.0 |
| Sodium sulfate | 14.7 |
| Organic carbon | 18.5 |
| Volatile acids as acetic | 31.3 |
| Barium as barium oxide | 0.1 |
| Calcium as calcium oxide | Trace |

Various modifications may be made in the method of the present invention without departing from the spirit or scope thereof, and it is to be understood that we limit ourselves only as defined in the appended claims.

We claim:

1. A process for regenerating an alkaline sulfide pulping liquor from black liquor containing sodium hydroxide, sodium sulfide, sodium sulfate and sodium carbonate which includes: oxidizing black liquor to destroy organic matter therein and convert the sodium salts substantially entirely to sodium sulfate and sodium carbonate by heating under a pressure sufficient to maintain at least part of the reaction mixture in the liquid phase, said black liquor at a temperature above about 240 degrees centigrade with sufficient oxygen to convert all the carbon to carbon dioxide and all the hydrogen to steam; liming the resulting oxidized liquor to convert a major proportion of the sodium carbonate therein to sodium hydroxide and form insoluble calcium carbonate; separating the insoluble calcium carbonate, thereby providing an alkaline filtrate; mixing said alkaline filtrate with an amount of barium sulfide chemically equivalent to a major proportion of the sodium sulfate therein; separating the insoluble barium sulfate; and, recovering and recycling a sulfide-enriched filtrate comprising sodium hydroxide, sodium carbonate, sodium sulfide and sodium sulfate suitable for use in digesting wood chips by an alkaline sulfide process.

2. A cyclic process for pulping wood which comprises: pulping wood with an alkaline sulfide pulping liquor containing at least sodium hydroxide, and sodium sulfide; separating the black liquor which results; washing the pulp and adding the washings to said black liquor; oxidizing the combined washings and black liquor by heating at a temperature above about 240 degrees centigrade and under sufficient pressure to maintain at least part of the reaction mixture in the liquid phase and in the presence of sufficient oxygen to convert substantially all the carbon to carbon dioxide, all the hydrogen to steam, and all the sodium to sodium carbonate and sodium sulfate; separating a sodium-containing liquid effluent; liming said effluent to convert a major proportion of the carbonate therein to insoluble calcium carbonate and a soluble hydroxide; filtering the mixture to separate the insoluble calcium carbonate and recovering an alkaline filtrate containing hydroxide, the unreacted soluble carbonate and soluble sulfate; mixing said alkaline filtrate thoroughly with an amount of barium sulfide up to that chemically equivalent to the amount of soluble sulfate therein; filtering the mixture to separate the sulfate ion as insoluble barium sulfate; recovering a filtrate containing soluble alkali, unreacted carbonate and the soluble sulfide; and, recycling this filtrate to pulp additional wood by an alkaline sulfide process.

3. The method of claim 1 wherein the barium sulfate separated is reduced to barium sulfide and the latter added to a succeeding portion of alkaline filtrate.

4. The method of claim 1 wherein the separated calcium carbonate is burned to lime and the latter used in liming a succeeding portion of oxidized liquor.

5. The process of claim 2 wherein the barium sulfate separated is reduced by heating with carbon to provide the barium sulfide for repeating the cycle.

6. The process of claim 2 wherein the filtrate is maintained above about fifty degrees Centigrade during the addition of the lime and barium sulfide.

7. The process of claim 2 wherein the calcium carbonate separated is burned to lime which is used to repeat the cycle.

8. The cyclic process which comprises: treating wood with an alkaline sulfide cooking liquor; separating the pulp and black liquor which results; washing the pulp and adding the washings to the black liquor; oxidizing in the liquid phase, the combined black liquor and washings by adding an excess of oxygen over that required to convert all of the carbon to carbon dioxide and all the hydrogen to water, and heating to at least 250 degrees centigrade and under at least 400 pounds per square inch pressure; separating and maintaining a soluble sodium salt solution above about fifty degrees centigrade; adding lime to solution in an amount sufficient to cause precipitation of at least 85 percent of the carbonate present as calcium carbonate; separating the calcium carbonate from the filtrate (A); burning the calcium carbonate to form lime which may be used in the previous liming step; treating, at a temperature above about fifty degrees centigrade, filtrate (A) with sufficient barium sulfide to theoretically react with all of the sulfate present; separating barium sulfate and filtrate (B); heating the barium sulfate with carbon to prepare barium sulfide which may be used in the previous barium sulfide step; adding filtrate (B) to pulp said wood; and, repeating the above process.

References Cited in the file of this patent

UNITED STATES PATENTS

| | | |
|---|---|---|
| 1,249,287 | Waite | Dec. 4, 1917 |
| 1,279,604 | Stage | Sept. 24, 1918 |
| 2,072,177 | Moore | Mar. 2, 1937 |
| 2,481,408 | Fuller | Sept. 6, 1949 |
| 2,665,249 | Zimmerman | Jan. 5, 1954 |

FOREIGN PATENTS

| | | |
|---|---|---|
| 218,344 | Germany | Jan. 15, 1910 |
| 43,863 | Norway | Mar. 21, 1927 |
| 80,421 | Sweden | May 15, 1934 |